(12) United States Patent
Taga et al.

(10) Patent No.: US 12,720,583 B2
(45) Date of Patent: Aug. 25, 2026

(54) NETWORK MANAGER, RECEIVING DEVICE AND METHOD

(71) Applicant: ROHDE & SCHWARZ GMBH & CO KG, Munich (DE)

(72) Inventors: Aziz Taga, Munich (DE); Lars Oestreicher, Munich (DE); Johannes Sinnhuber, Kaufering (DE); Maurice Uhlmann, St. Wolfgang (DE); Thomas Janner, Grobenzell (DE); Manfred Reitmeier, Landshut (DE)

(73) Assignee: Rohde & Schwarz GmbH & Co. KG, Munich (DE)

(*) Notice: Subject to any disclaimer, the term of this patent is extended or adjusted under 35 U.S.C. 154(b) by 327 days.

(21) Appl. No.: 18/558,935

(22) PCT Filed: May 4, 2022

(86) PCT No.: PCT/EP2022/062013
§ 371 (c)(1),
(2) Date: Nov. 3, 2023

(87) PCT Pub. No.: WO2022/233954
PCT Pub. Date: Nov. 10, 2022

(65) Prior Publication Data

US 2024/0237040 A1 Jul. 11, 2024

(30) Foreign Application Priority Data

May 4, 2021 (EP) ..................................... 21172116

(51) Int. Cl.
*H04W 72/52* (2023.01)
*H04W 72/04* (2023.01)
*H04W 72/30* (2023.01)

(52) U.S. Cl.
CPC ........... *H04W 72/52* (2023.01); *H04W 72/04* (2013.01); *H04W 72/30* (2023.01)

(58) Field of Classification Search
CPC ..... H04W 72/52; H04W 72/04; H04W 72/30; H04L 65/611; H04L 65/80
(Continued)

(56) References Cited

U.S. PATENT DOCUMENTS 10,567,971 B2 * 2/2020 Eng ...................... H04H 20/423
2012/0028655 A1 2/2012 Mueck et al.
(Continued)

FOREIGN PATENT DOCUMENTS

EP 2934045 A1 10/2015

OTHER PUBLICATIONS

European Patent Office, extended European Search Report for Application 21172116.2-1215 dated Nov. 17, 2021.
(Continued)

*Primary Examiner* — Candal Elpenord
(74) *Attorney, Agent, or Firm* — Patterson + Sheridan, LLP; Carleton S. Clauss

(57) ABSTRACT

The present disclosure provides a network manager comprising a data interface configured to communicatively couple to a first group of radio access networks that are configured to wirelessly emit a load data signal in geographical regions that overlap at least partially, and to communicatively couple to a load data source network that provides load data capable of being separated into load data parts; and a network controller communicatively coupled to the data interface and configured to provide different configuration data to at least two of the radio access networks of the first group for the purpose of configuring the at least two radio access networks to each use individual radio access network resources for transmission of at least two
(Continued)

respective load data parts. The present invention further provides a respective receiving device and a respective method.

17 Claims, 4 Drawing Sheets

(58) Field of Classification Search
USPC .......................................... 370/229–230, 312
See application file for complete search history.

(56) References Cited

U.S. PATENT DOCUMENTS

| | | | | |
|---|---|---|---|---|
| 2013/0114497 | A1* | 5/2013 | Zhang | H04W 72/30<br>370/312 |
| 2013/0237143 | A1* | 9/2013 | Kim | H04W 4/06<br>455/3.01 |
| 2013/0294321 | A1* | 11/2013 | Wang | H04W 28/16<br>370/312 |
| 2014/0355522 | A1* | 12/2014 | Diab | H04W 88/06<br>370/328 |
| 2020/0169849 | A1* | 5/2020 | Agarwal | H04B 17/336 |
| 2021/0281515 | A1* | 9/2021 | Basavaraj | H04L 12/185 |
| 2023/0171845 | A1* | 6/2023 | Ma | H04W 76/40<br>370/312 |
| 2024/0056901 | A1* | 2/2024 | Dai | H04W 36/0007 |
| 2024/0056902 | A1* | 2/2024 | Zhang | H04W 36/0007 |

OTHER PUBLICATIONS

PCT, Notification of Transmittal of the International Search Report and the Written Opinion of the International Searching Authority, or the Declaration for Application PCT/EP2022/062013 dated Aug. 12, 2022.

* cited by examiner

NETWORK MANAGER, RECEIVING DEVICE AND METHOD

TECHNICAL FIELD

The disclosure relates to a network manager, a respective receiving device and a respective method.

BACKGROUND

Although applicable to any combination of different networks, the present disclosure will mainly be described in conjunction with broadcast networks and cellular networks.

Today, the number of communication devices that are served in cellular networks increases steadily. One source of new communication devices is the increasing demand of users for mobile voice and data communication. Other sources of this increase are new applications, like Internet-of-Things or IoT devices.

With an increasing number of communication devices, cellular networks become more and more complex. Consequently, the technical and financial efforts required for building and managing such networks continually increase.

There is a need for reducing these efforts.

SUMMARY

The above stated problem is solved by the features of the independent claims. It is understood, that independent claims of a claim category may be formed in analogy to the dependent claims of another claim category.

Accordingly, it is Provided:

A network manager comprising a data interface configured to communicatively couple to a first group of radio access networks comprising at least two radio access networks of a broadcast network that are configured to wirelessly emit a load data signal, wherein the geographical regions in which the radio access networks of the first group emit the load data signal overlap at least partially, and to communicatively couple to a load data source network that provides load data capable of being separated into load data parts for transmission by the radio access networks of the first group; and a network controller communicatively coupled to the data interface and configured to provide different configuration data to at least two of the radio access networks of the first group for the purpose of configuring the at least two radio access networks to each use individual radio access network resources for transmission of at least two respective load data parts.

Further, it is Provided:

A receiving device comprising a wireless receiver configured to receive data via a cellular network and via a broadcast network; and a reception controller communicatively coupled to the wireless receiver and configured to control the wireless receiver in a first operation mode to receive load data via the cellular network, and in a second operation mode to receive different load data parts of the load data via the broadcast network; wherein in the second operation mode the reception controller is configured to combine the received load data parts to reconstruct a load data transmitted via the broadcast network.

Further, it is Provided:

A method for managing a broadcast network, the method comprising defining different configuration data for at least two radio access networks of a first group of radio access networks for the purpose of configuring the at least two radio access networks to each use individual radio access network resources for transmission of at least two respective load data parts of a load data that is provided by a load data source network and is capable of being separated into load data parts for transmission by the radio access networks of the first group; the first group of radio access networks comprising at least two radio access networks of the broadcast network that are configured to wirelessly emit a load data signal, wherein the geographical regions in which the radio access networks of the first group emit the load data signal overlap at least partially; and providing the different configuration data to the at least two radio access networks.

The present disclosure acknowledges the fact that serving more devices in cellular networks increases the complexity of the networks, since smaller cells need to be provided, or more capable transmitters need to be provided, to serve the increased number of devices. With increasing capabilities, the complexity and therefore also the costs for the transmitters raise. The same may apply to the power consumption of such transmitters. Operating the cellular network therefore becomes more demanding technically and economically.

When planning a cellular network, the operator of the network may estimate the average load on the cellular network and dimension the cellular network accordingly. However, when a cellular network is dimensioned for an average load, the cellular network may experience congestion and overload situations.

Such situations may for example arise when an important event, like a live sports event is viewed by many users on their mobile devices. The data stream comprising e.g., video and audio data for such a sports event, needs to be provided to all transceivers of the cellular network that currently serve at least one user that wants to view the event. In addition, users today expect a flawless experience, where the video and audio data is distributed with low latencies and high quality, an expectation that is difficult to meet, especially under high-load conditions.

This is especially true, since mobile cellular networks have been based, and still rely on a strong unicast communication model to provide various services to their end users. However, nowadays consumers find their comfort while watching a huge amount of premium content, of which a high percentage is live media services.

On the other hand, broadcast networks are well established for broadcast and multicast data transmission like TV and radio transmissions via digital video broadcast like DVB-T, for terrestrial transmission, or DVB-S, for satellite transmission. Since broadcast networks are usually designed to provide broadcast or multicast one-way data transmission, these networks may operate efficiently with any number of receiving devices. Further, since the area of coverage of a transmitter of a broadcast network is larger than the area of coverage of a transmitter of a cellular network, which is especially the case for satellite-based broadcast networks, the network infrastructure of broadcast networks is less complex to build and maintain than the infrastructure of cellular networks.

The present disclosure acknowledges that users will demand more and more services from cellular networks on their mobile devices that either require overprovisioning or may lead to congestion in the cellular networks. The present disclosure, therefore, provides means for effectively using the infrastructure provided by broadcast networks to provide data to devices that usually operate in cellular networks.

A cellular network in the context of the present disclosure may be a communication network providing bi-directional wireless communication for electronic devices, like user equipment such as mobile phones, also called UE, IoT devices and the like. Usually, a cellular network is a distributed network comprising "cells", wherein each cell is served by at least one fixed-location transceiver. A site hosting the fixed-location transceivers may also be called a base station. A cellular network usually allows transmission of voice, video and audio data and other types of content. Neighboring cells usually use different sets of frequencies to avoid interference between the single cells. Mobile devices in the cellular network may perform a hand-over when moving from one cell to another. All cells together form the cellular network and provide radio coverage over a wide geographical area, wherein small local cells, e.g. indoor cells, are also possible. A cellular network in the context of the present disclosure may also comprise a satellite-based cellular network. Such a satellite-based cellular network may offer bidirectional communication to receiving devices in small cells with low flying satellites. Usually, such a satellite-based cellular network will comprise a large number of satellites. These types of satellite-based cellular network may be designed for unicast data communication.

The single transceivers of a cellular network are usually communicatively coupled to a common network, also called core network or backbone network. Data may be served to the transceivers from the common network and may be provided from the transceivers into the common network. It is understood, that the common network not necessarily is a single network, but may also comprise different network segments that may be communicatively coupled to each other via other networks, like e.g. the internet or dedicated backbone networks.

In cellular networks traditionally, a point-to-point communication is performed, like e.g. when a telephone call is conducted between to devices. In modern cellular networks like e.g., 5G networks, multicast transmissions are also possible. Due to the limited size of the single cells in a cellular network, the data to be transmitted in a multicast mode hast to be transmitted to every single transceiver via the common network.

In the context of the present disclosure, the operator of a cellular network may also be called the MNO or mobile network operator.

A broadcast network in the context of the present disclosure may be a one-way communication network that usually provides at least one of audio communication and/or video communication in a one-way or unidirectional fashion to electronic devices, like radio receivers or TV sets. It is understood, that a broadcast in the context of the present disclosure may be terrestrial broadcast network, a satellite broadcast network or a combination of both.

It is understood, that in the context of the present disclosure, a broadcast network may also provide communication to devices that are usually served by cellular networks. Further, in the context of the present disclosure a broadcast network is not limited to broadcast transmissions, but may also provide multicast transmissions. A broadcast transmission in this context is to be understood as a transmission to all receivers within reach of a single transmitter. A multicast transmission in this context is to be understood as a transmission to a limited group of receivers within reach of a single transmitter, instead of all receivers.

A broadcast network may be formed by a group comprising at least one of a plurality of radio stations, a plurality television stations, or combined radio and television stations, or satellite stations. The term radio station refers to equipment for transmitting audio content wirelessly e.g., over the air. The term television station refers to equipment for transmitting audio and video content wirelessly e.g., over the air. The term satellite station refers generally to a satellite that is communicatively linked to a ground station and may be used as a radio access network or transmitter in the broadcast network.

It is understood, that for a broadcast network a common network, also called core network, may be provided that couples to the single transmitters, as explained above for cellular networks. If one or more satellites are part of the broadcast network, the respective ground stations may be communicatively coupled to the core network of the broadcast network. Since the area of coverage of a transmitter of a broadcast network is larger than the area of coverage of a transmitter of a cellular network, the common network needs to connect to a smaller number of transmitters and therefore usually is of lower complexity than the common network of a cellular network.

As explained above, the geographical area covered by each of the transmitters of a broadcast network is larger than the geographical area covered by each of the transmitters of a cellular network. In embodiments, the geographical area covered by each of the transmitters of a broadcast network may comprise an area larger than the geographical area covered by at least two transmitters of a cellular network, i.e. larger than two cells of the cellular network.

In examples, the area covered by a single terrestrial transmitter of a broadcast network may comprise a radius of about 1 km up to more than 100 km. The area covered by a single transmitter of a cellular network may comprise a radius of up to 35 km. At the same time, the transmitting power of a transmitter in a broadcast network may range up to 20 KW. In cellular networks, the transmitting power of the respective transmitters may range up to 500 Watts. Further, the transmitters in broadcast networks will usually use other frequencies than the transmitters in cellular networks. The transmitters in the broadcast networks may for example use frequencies in the UHF band, for example between 470 MHz and 698 Mhz.

For satellites as transmitters, the size of the area of coverage may be size of the full earth globe, and the transmission power may be between 20 W and 300 W (depending on the bands and the usage).

Exemplary standards used in broadcast networks may comprise DVB-based protocols, especially DVB-T and DVB-S based protocols, ATSC-based protocols, and 5G for broadcast networks or any future broadcast network standard. In cellular networks, the respective standards like UMTS, LTE and 5G or any future cellular network protocol may be used.

In the context of the present disclosure, the operator of a broadcast network may also be called the BNO or broadcast network operator.

The cellular networks and the broadcast networks mentioned in the present disclosure may comprise so called radio access networks or RANs and core networks or CNs. A RAN or Radio Access Network provides a radio access technology, and usually resides between a user device and the respective CN. A RAN in the context of the present disclosure may comprise the base station with respective antennas and a connection to the CN, and/or a satellite with connection to the CN via a respective ground station.

The radio access networks, also called RANs, and core networks, also called CNs, mentioned in the present disclosure are not limited to a specific type of network. Nevertheless, in the present disclosure a RAN with regard to cellular networks may comprise at least one of a GRAN, also GSM radio access network, a GERAN, which is essentially the same as GRAN but specifying the inclusion of EDGE packet radio services, a UTRAN, also called UMTS radio access network, and an E-UTRAN, the Long Term Evolution (LTE) high speed and low latency radio access network, or a RAN according to any upcoming RAN standard, or satellite-based RAN.

Accordingly, in the present disclosure a RAN with regard to a broadcast network may comprise any technology that allows transmitting data in a broadcast or multicast manner to electronic devices. Such a RAN may for example comprise a DVB-T transmitter with respective antennas and a connection to the respective core network, or a satellite as DVB-S transmitter with respective antennas and a connection to the respective core network via the ground station of the satellite.

Possible RANs comprise, but are not limited to, multi-frequency network or MFN RANs, single frequency network or SFN RANs, and SC-PTM RANs, also called Single-Cell—Point-to-Multipoint RANs. The RANs in the context of the present disclosure may for example comprise so called LPLT transmitters, also called low-power low-tower transmitters, HPHT transmitters, also called high-power high-tower transmitters, MPMT transmitters, which are a hybrid transmitter combining elements of LPLT and HPHT transmitters. MPMT stands for Medium Power Medium Tower. MPMT transmitters may have an output power that comes in between LPLT and HPHT, e.g. 350 W-6 KW, which automatically results in a coverage capability between those of LPLT and HPHT, e.g. 5 KM-30 KM, depending on the specific deployment scenarios and other parameters. Further, a RAN in the context of the present disclosure may comprise at least one transmitter with a fixed geographical location. As explained above, a transmitter for a broadcast network may comprise a transmitting power of up to 20 KW or more, and cover an area of more than 100 km radius.

The term core network in the context of the present disclosure refers to a network that couples to the RANs of the respective network e.g., the above-mentioned common network. Core networks are sometimes also referred to as backbone networks. It is understood, that any networking technology, like cable-based ethernet, optical fiber-based ethernet, or other network technologies may be used to transmit data in the core network to and from the RANs. The core network may further comprise connections to other networks, like the networks of content providers or the like.

It is understood, that radio access networks and core networks in the context of the present disclosure may comprise further elements, like network connections, network switches, network hubs, servers, and the like.

The present disclosure acknowledges, as indicated above, that data may be offloaded from load data source networks, like cellular networks, to a broadcast network. To support offloading of load data to the broadcast network, the present disclosure provides the network manager.

The network manager comprises a data interface that communicatively couples a network controller to at least one radio access network of the broadcast network and a load data source network. Such a load data source network may be the core network of the broadcast network. The core network usually transports load data to the radio access networks for emission in a load data signal to the receiving devices.

The load data that is provided via the load data source network to the radio access networks and is load data that may be separated into load data parts. Different load data parts may be provided by the load data source network to different ones of the radio access networks of the first group or to the network manager for forwarding to the radio access networks.

It is understood, that the load data source network and the radio access networks may be operated by the same operator. The network controller may therefore be coupled via a single network interface to the load data source network and the radio access networks. Communicatively coupled in this context refers to the data interface being capable of communicating with the respective entity, while a direct network connection or indirect network connection e.g., via other networks like the internet, is possible. Further, the data interface may comprise a single hardware interface or multiple hardware interfaces.

In other examples, the load data source network and the radio access networks may be operated by different operators and may not be provided in the same network. The data interface in such an example may communicatively couple to the different operators' networks as required directly or indirectly via a single or multiple hardware interfaces.

The network manager of the present disclosure may be provided in the broadcast network. In such an embodiment the data interface may be an internal interface in the broadcast network. The network manager may for example be provided as dedicated element, like a server in the broadcast network. Such a server may be communicatively coupled to the core network of the broadcast network via a hardware-based data interface, like an Ethernet interface. The network manager may also be provided as an additional function in a server that is already present in the core network. Such a network manager may for example be provided as software application in the server or a function of a firmware or operating software of the server. Such a network manager may comprise the data interface as a software-based interface, like an API, or as a combination of a software-based and hardware-based interface.

The network manager comprises a data interface that may communicatively couple to a first group of radio access networks. The first group of radio access networks comprises at least two radio access networks. The geographical regions in which the radio access networks of the first group emit the load data signal overlap at least partially. This means, that a receiving device may at the same time receive signals from the at least two radio access networks of the first group of radio access networks.

It is understood, that the broadcast network may comprise any number of groups of radio access networks that may all be coupled, directly or indirectly, to the data interface. The single radio access networks of such a broadcast network may be distributed over a specific geographical area like e.g., a country or simply the area of operation of a network operator that operates the broadcast network. The core network of such a broadcast network distributes load data to the radio access networks as load data parts via the radio access networks. It is understood, that the core network may comprise routing mechanisms that allow transmitting specific pieces of load data parts only to those radio access networks that should emit the load data parts in respective load data signals. It is understood, that the load data refers to the content or content data that is to be transmitted to receiving devices. Such load data may comprise video data, audio data, software update data, or any other type of data that is to be transmitted.

It is understood, that the core network may comprise a respective interface or respective interfaces that allow operators of cellular networks or other content providers to provide the load data to the core network. Such interfaces may comprise hardware-based network interfaces, API-based or software-based interfaces, or a combination of both. The core network may for example be coupled via a hardware interface to a network of a content provider or cellular network operator directly or indirectly. The load data may be provided to the core network via an upload functionality that is provided by the core network. It is understood, that such an upload functionality may comprise security measures, like e.g. authentication and encryption. In embodiments, the core network may for example comprise one or more FTP or HTTP(S) servers, that allow a content provider to upload the load data. In case of live streaming data, the core network may also provide a streaming end-point, that accepts the load data in the form of a stream for further processing in the core network. In other embodiments, the broadcast network e.g., the network controller mentioned below or other elements of the core network, like a data loader, may be configured to retrieve the load data from a location that may be indicated by the provider of the load data.

The core network may provide the single load data parts to the respective radio access networks of the first group. In this case, the network controller may inform the core network of how the radio access networks are configured and/or which load data part should be provided to which one of the radio access networks.

In other examples, the load data source network may provide the load data to the network manager, and the network manager may provide the load data parts to the single radio access networks, or the network manager may separate the load data into load data parts and provide them back to the core network of the broadcast network for transmission to the radio access networks.

With the network manager of the present disclosure, it is possible to transmit load data to receiving devices, even if the radio access network resources of a single radio access network are not sufficient to transmit the load data.

For example, a content provider may request the transmission of a live video in a specific region. If the available radio access network resources in that region are not sufficient to transmit the video, the network manager of the present disclosure may be used to split the load data into different load data parts, for example an audio load data part and a video load data part. The single load data parts may then be transmitted via different radio access networks that cover the same region. It is understood, that the load data may be provided by the load data source network already split into the load data parts. Alternatively, the network manager may comprise a data splitter configured to split the load data into the load data parts.

Splitting of the load data not necessarily requires splitting the load data into different types of data, like audio and video. The splitting may also comprise alternatingly providing data packages of the load data of a predefined size in the load data parts. A load data comprising data P1, P2, P3, P4, P5, P6 may for example be split into three load data parts 1: (P1, P4), 2: (P2, P5), and 3: (P3, P6) for transmission via three radio access networks. This type of splitting may not only be used with video data, but also with any arbitrary data, like e.g. program data that may be used to update firmware of IoT devices or the like.

It is understood, that receiving devices in the context of the present disclosure may comprise a reception controller configured to reassemble or reconstruct the original load data from the load data parts received via different radio access networks. Receiving devices in the context of the present disclosure may comprise a wireless receiver that may receive signals comprising the load data via a cellular network and via the broadcast network in different operation modes.

The reception controller may control the wireless receiver to operate in a respective mode of operation. It is understood, that the reception controller may receive information on how to control the wireless receiver via the cellular network, prior to receiving the load data via the broadcast network, or in the load data provided via the broadcast network. The data received via the cellular network may for example indicate the radio access network resources used for transmitting the load data via the broadcast network, and the reception controller may configure the wireless receiver accordingly.

In case of audio and video load data being transmitted a separate load data parts, the receiving devices may be configured to reassemble the original video stream including the audio stream for displaying to a user. In case of software data, the receiving devices may reassemble the original software data.

The network manager serves for configuration of the radio access networks. The network controller configures the single radio access networks of the first group to emit the load data signal comprising the respective load data parts, such that receiving devices, like a UEs, may receive all load data parts and reassemble the original load data.

To this end, the configuration data will configure the respective radio access networks to emit the load data signal as indicated with the individual radio access network resources.

The individual radio access network resources are chosen such that, even if the geographical regions in which the radio access networks of the first group emit the load data signal overlap, each load data signal and therefore load data part may be received in the receiving devices, to reconstruct the full load data, as exemplarily indicated above.

It is understood, that the network controller may provide the configuration data to the radio access networks prior to the load data source network providing the load data to the respective radio access networks. To this end, the configuration data may identify the load data or load data parts with a respective identifier that may be provided in the configuration data and the load data or load data parts. This allows for example pre-configuring the radio access networks when request data from a load data provider is received, which may be long before the load data is to be emitted, and therefore long before the load data is provided by the load data source network. This may for example be the case, when a cellular network operator reserves radio access network resources for the transmission of a live event, like a sports event or a live concert, long before the event is happening via a respective request.

The radio access networks may comprise respective controllers that receive and store the configuration data and control the transmitter elements in the radio access networks to use the respective radio access network resources accordingly. In modern network architectures, single elements may be virtualized. Therefore, the controllers of the radio access networks may also be provided as virtualized controllers in servers that are provided in the respective core network. Respective configuration data may then be provided from the virtualized controllers to the other elements of the radio access networks. It is understood, with the possibility of virtualizing network elements, that an element that is disclosed in the present disclosure as being part of or being comprised by another element, may be functionally linked to the other element. At the same time such an element may be virtualized and provided at another location but linked via respective data connections to the other element.

It is understood, that the configuration data and the load data or load data parts may be provided to the radio access networks as separate information, especially if the configuration data is provided before the load data. However, in cases where the configuration data is provided at the same time as the load data or load data parts, the configuration data and the load data or load data parts may be provided to the radio access networks as combined data. The network controller may for example receive the load data via the data interface and provide the configuration data as a header to the load data or load data parts. Alternatively, the network controller could provide the configuration data to the load data source network, which could add the configuration data as header data to the load data. This also allows dynamically changing the configuration data for different segments of the load data that comprise a dedicated header.

A broadcast network in the context of the present disclosure is capable of dynamically receiving the load data from e.g., a cellular network, and of transmitting the load data to electronic devices, that usually receive the load data via the cellular network. Instead of by a cellular network, the load data may also be provided directly by a content distribution network or other content providers.

The broadcast network in the context of the present disclosure may transmit the load data to the receiving devices with high throughput or data rates, even if no single radio access network has the required resources, by splitting the load data into load data parts, that are then transmitted via different radio access networks of the first group. The network manager performs the configuration of the single radio access networks.

Especially for cellular networks, the broadcast network provides a kind of backup network or offloading network for high load situations. Further, via the network controller an operator of such a network, like a cellular network, may dynamically offload load data into the broadcast network. It is understood, that the respective receiving devices may be informed via the respective network e.g., the cellular network, about the transmission of the load data via the broadcast network.

Further embodiments of the present disclosure are subject of the further dependent claims and of the following description, referring to the drawings.

In an embodiment, the individual radio access network resources may comprise at least one of a geographical location for transmission of the load data, a frequency range or bandwidth for transmission of the load data, a transmission time or time slot for transmission of the load data, and a modulation scheme used for transmission of the load data.

The radio access network resources define how the load data signal is emitted by the transmitters of the single radio access networks. They are defined by the network controller for the single radio access networks. It is understood, that different radio access networks may still be assigned at least some identical radio access network resources.

The geographical location may refer to all radio access networks of the first group, and define the overlapping geographical regions in which the radio access networks of the first group emit the load data signal. It is understood, that such a geographical location may indirectly be defined by the network controller by selecting the respective radio access networks as receivers of the configuration data. The load data source network may also provide the load data parts only to the respective radio access networks.

The frequency range or bandwidth for transmission of the load data may be defined based on the required bandwidth for transmission of the load data. It is understood, that the provider of the load data e.g., a cellular network provider or a content provider, may define the required data rate and therefore indirectly also the required frequency range or bandwidth.

If for example, the load data is a live video stream, the required bandwidth will be determined by the quality of the video stream i.e., the resolution and encoding of the video stream. In case of the load data comprising program data, no limit regarding a maximum or minimum data rate needs to be set by the provider of the load data. In such cases, the network controller may allocate the maximum possible bandwidth for transmission of the load data. In other embodiments, the provider of the load data may request a reduced data rate for example to save on transmission costs in the broadcast network.

Such a configuration would allow the network controller to allocate different small sections in the possible frequency bands in order to take maximum advantage of the available frequency spectrum.

Regarding the transmission time, the network controller may chose an individual transmission time or time slot for every radio access network of the first group. Depending on the type of the load data, the transmission times or time slots may be the same or at least within a certain range for all radio access networks or may be independently chosen. This requirement may also be indicated by the provider of the load data and respective information for the receiving devices may be provided in the load data parts.

If for example, a video stream is transmitted, the transmission times for all load data parts must be synchronized by the network controller. Synchronization in this context refers to transmitting the load data parts in such temporal intervals that the receiving device is capable of reconstructing the complete video stream without causing artefacts or any other deteriorations of the video quality.

If in contrast, program data is transmitted, the temporal synchronization is not that important. The load data parts of the different radio access networks may in this case for example be transmitted temporally spaced apart such that a video stream could not be fully reconstructed. However, the single load data parts may be stored in the receiving device and the load data may then be reconstructed after all load data parts are received.

For example, an operator of a network of IoT devices, that in this example are the receiving devices, like for examples inter-communicated vehicles, may request the transmission of program data, like a software update, during the night. The single vehicles may store any received load data part and assemble the original load data after receiving all load data parts. Therefore, the network controller may schedule single load data parts to different radio access networks and at completely different times during that night.

The configuration data may be provided by the network controller to the radio access networks in a format that is understood by the radio access networks and if required, also the core network.

In another embodiment, the network controller may be configured to provide the configuration data based on a radio access network resources schedule of the broadcast network, the radio access network resources schedule comprising information about reservations of radio access network resources for the broadcast network.

The radio access network resources schedule represents the availability of the radio access network resources for different points in time. The radio access network resources schedule, therefore, allows identifying possible combinations of radio access network resources for a transmission of load data.

The radio access network resources schedule may be stored in the network controller or a dedicated database and may comprise information about reservations or utilizations of the single radio access network resources in the radio access networks.

It is understood, that the radio access network resources schedule may apply only to those radio access network resources that are limited. In embodiments, the radio access network resources schedule may be maintained for radio access network resources like e.g., transmission frequencies or frequency ranges or a bandwidth of the load data signal, geographical areas or locations, and a transmission time for the load signal.

It is understood, that the radio access network resources schedule may be provided in any adequate format. The radio access network resources schedule may for example be based on time-slots, and may indicate for a specific radio access network resource, which time slots are occupied by the respective radio access network resource. The time slots of the radio access network resources schedule are not necessarily identical to the time slots used in some RF transmission systems. Instead, the time slots of the radio access network resources schedule may comprise a predefined length, for example 1 min, 5 min, 10 min, or more.

In another embodiment, the radio access network resources schedule instead of using time slots, may indicate for every radio access network resource a start time and an end time. This allows more flexibly reserving the single radio access network resources without being bound to the time slots.

When used in combination with the below-mentioned user-accessible interface that is accessible via a data network, the radio access network resources schedule may be shown in calendar form.

The radio access network resources schedule may further store the amount that is available of every radio access network resource. This information may in embodiments be stored individually for single elements of the broadcast network. For example, different radio access networks may comprise different transmitters with different capabilities regarding e.g., bandwidth, modulation schemes, frequency ranges, and the like. If the radio access network resources schedule stores such information individually for all elements of the broadcast network, it is possible to effectively select all available radio access network resources for a transmission of load data.

In yet another embodiment, the network controller may be configured to request information about reservations of radio access network resources in the radio access networks from at least one of the load data source network and the radio access networks, and provide the configuration data based on received responses.

Instead of maintaining or in addition to maintaining the radio access network resources schedule, the network controller may request the information about reserved radio access network resources from the load data source network or the radio access networks.

This allows the network controller to configure a load data transmission via the first group based on the most recent reservation information. This is especially useful if other entities than the network controller may also reserve radio access network resources or configure the radio access networks.

In a further embodiment, the network controller may be configured to amend at least one of the load data parts to include reception information regarding the other load data parts. The reception information may for example comprises at least one of timing information, synchronization information, data regarding radio access network resources used for transmission of the respective load data parts, and data indicating an operation mode change for a receiving device, especially indicating switching the receiving device into a multichannel receiving mode.

In an embodiment, the load data parts may not be provided directly from the load data source network to the radio access networks. Instead, the network controller may receive the load data and provide the at least one load data part to the radio access networks. Alternatively, the network controller may indirectly amend the at least one load data part e.g., by providing the reception information to the load data source network, where the load data parts may be amended accordingly.

It is understood, that in embodiments, the load data may be provided with the reception information by the provider of the load data. However, if this is not the case, the reception information may be added by the network controller. This allows providing a full service data offloading to the provider of the load data, where all the data handling after receiving the load data is performed by the network manager.

The network controller may therefore include reception information in at least one of the load data parts. The expression "reception information" refers to any information that may be required in the receiving device to reassemble the load data from the different load data parts. The reception information may be provided only in one of the load data parts, for example the load data part that is started to be transmitted to the receiving devices first. In other cases, the reception information may be provided in more load data parts.

The reception information may for example comprises timing information or synchronization information. Such information may refer to the time of emission of the other load data parts or a sequence in which the load data parts are transmitted.

If the reception information is provided only in one load data part, this load data part may be provided with a kind of emission schedule, that allows the receiving device to identify and receive all other load data parts. If the reception information is provided in multiple or all load data parts, the single load data parts may for example comprise an ordinal number or counter that indicates which position the respective load data part has in the load data.

If the load data parts comprise different types of data pertaining to a set of load data, like for example an audio stream and a video stream of video load data, the single load data parts may comprise time stamps or other data that allows synchronizing the two types of data e.g., the audio and the video streams. It is understood, that this type of synchronization information may be combined with the above-mentioned type of synchronization information.

For example, a video comprising an audio stream and a video stream may be provided as load data comprising load data parts P1, P2, P3, P4, P5, P6. The load data parts may be transmitted via two radio access networks as load data parts (P1, P3, P5), and load data parts (P2, P4, P6).

The synchronization information may now indicate that the correct order of the load data parts is P1, P2, P3, P4, P5, P6. Further, the synchronization information may also provide time stamps for synchronizing the audio stream and the video stream.

The reception information may also comprise data regarding radio access network resources used for transmission of the respective load data parts, especially frequencies or frequency ranges and modulation schemes used for transmission of the load data. Such information allows a receiving device to configure its internal receivers accordingly.

The reception information may also comprise data indicating an operation mode change for a receiving device, especially indicating switching the receiving device into a multichannel receiving mode. Such data allows indicating to the receiving device that a change of its mode of operation may be necessary to receive the different load data parts.

Especially, the reception information comprising e.g., data regarding radio access network resources used for transmission of the respective load data parts, and comprising data indicating an operation mode change for a receiving device, may be added e.g., by the network controller, to the load data parts, if such information is not provided by the load data provider. This allows providing the transmission of the load data as a kind of all-inclusive service that may be performed without any additional effort on the side of the load data provider.

In yet another embodiment, the data interface may be configured to couple to a second group of radio access networks comprising at least two radio access networks that are configured to wirelessly emit a load data signal, wherein the geographical regions in which the radio access networks of the second group emit the load data signal overlap at least partially. The network controller may amend at least one of the load data parts transmitted via the radio access networks of the first group to include reception information regarding the load data parts transmitted via the radio access networks of the second group, and vice versa.

Regarding the amendment of the load data parts, the explanations provided above regarding a direct or indirect amendment of the load data parts by the network controller also applies here.

The radio access networks of the second group may emit the load data signals in a geographical region different than the radio access networks of the first group. This geographical region may however be neighboring to the geographical region in which the radio access networks of the first group emit the load data signals, and at least overlap in the peripheral sections of the geographical regions.

Today receiving devices may be mobile devices, like for example smartphones or tablet PCs. Therefore, the receiving devices may move out of range of the radio access networks of the first group. The same load data may, however, also be transmitted to receiving devices via the radio access networks of the second group in a neighboring geographical region.

In order to allow such a moving receiving device to continue receiving the load data also in the geographical region covered by the radio access networks of the second group, at least one of the load data parts provided via the first group of radio access networks may be amended with respective reception information. The explanations provided above for the reception information applies here mutatis mutandis.

Such reception information may especially indicate a transmission time or time slots, frequencies or frequency ranges, modulation schemes and the like used for transmission of the load data parts in the second group of radio access networks.

In another embodiment, the network manager may comprise a data storage that is configured to receive the load data and store the received load data in the data storage prior to providing the load data parts to the radio access networks for transmission in the load data signal.

The network manager may receive the load data in advance to the emission of the load data via the radio access networks and store the load data in a respective data storage to pre-store the load data for later transmission. This is especially relevant for load data that does not represent live footage and does not need to be emitted instantly.

The network manager may therefore serve as a temporary storage for offloading load data from the content provider e.g., a cellular network. This allows reducing the size and/or number of storages in the content providers network.

Further, if the load data is pre-stored in the broadcast network, it is also possible to emit the load data in a bulk emission to the receiving devices. This may for example be used to pre-store load data in the receiving devices. For example, an operator of a cellular network may notice an increased interest in specific content like e.g., a new season of a TV series or the currently most watched movies. Such content may pose a problem for a cellular network, because it constantly causes high network load if many users watch the same series concurrently.

With the data storage, the cellular network operator may provide a full season of a series or the most watched movies to the network manager and request the transmission of the load data in bulk to the receiving devices. The single receiving devices may then store the load data that is transmitted in bulk for viewing later by the users.

The bulk emission of the load data may be performed during times of the day that usually comprise only a low amount of load data emitted via the broadcast network, for example during the nights.

In addition, a bulk emission may be performed at the maximum possible speed, instead of at a streaming data rate. Therefore, the time required to perform a bulk transmission is reduced compared to streaming a video.

In other embodiments, a broadcast network may also offload data to cellular networks, i.e. the other way as described above. This may be used by the operator of the broadcast network e.g., to fulfill service level agreements, even if the broadcast network is not operating at full capacity for any reason.

In a further embodiment, in the receiving device the reception controller may be configured to control the wireless receiver and reconstruct the load data based on reception information provided in at least one of the load data parts, especially based on at least one of timing information, synchronization information, data regarding radio access network resources used for transmission of the respective load data parts, and data indicating an operation mode change for a receiving device, especially indicating switching the receiving device into a multichannel receiving mode.

The present disclosure is meant to expressly disclose a broadcast network comprising the network manager. Such a broadcast network may comprise a first group comprising at least two radio access networks, a core network as load data source network, and a network manager.

BRIEF DESCRIPTION OF THE DRAWINGS

For a more complete understanding of the present disclosure and advantages thereof, reference is now made to the following description taken in conjunction with the accompanying drawings. The disclosure is explained in more detail below using exemplary embodiments which are specified in the schematic FIGURES of the drawings, in which.

In the FIGURES like reference signs denote like elements unless stated otherwise.

DETAILED DESCRIPTION OF THE DRAWINGS

Figure 1:
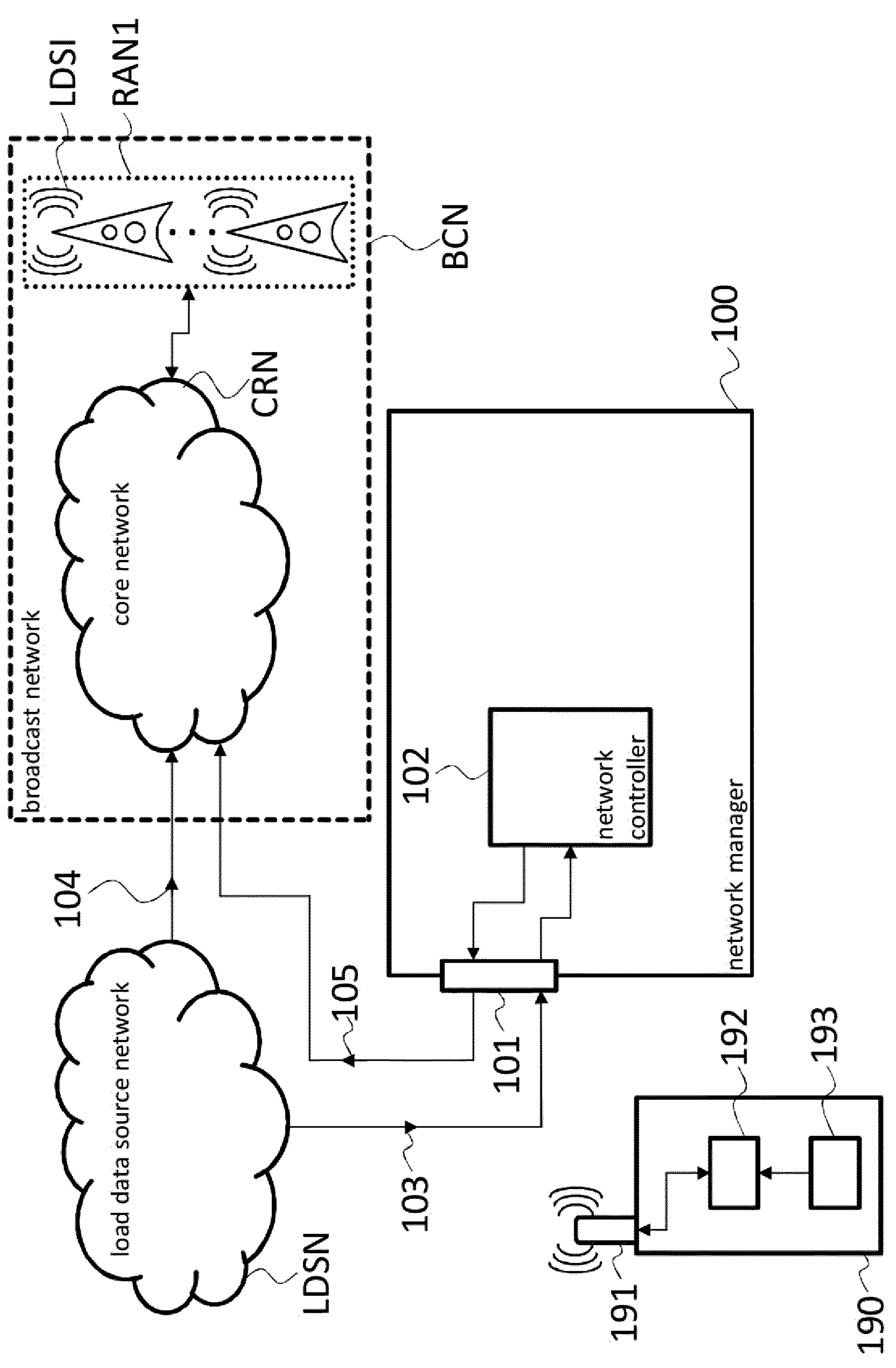
FIG. 1 shows a schematic diagram of an embodiment of a network manager and a receiving device according to the present disclosure, a load data source network and a broadcast network.

FIG. 1 shows a schematic diagram of a network manager 100 together with receiving device 190, a load data source network LDSN and a broadcast network BCN.

The load data source network LDSN may be the network of a load data provider, like for example a streaming media service. It is understood, that the load data source network LDSN may comprise data storages, network devices and any other element required to provide the respective services offered by the load data source network LDSN.

The broadcast network BCN comprises a core network CRN that is communicatively coupled to a first group RAN1 of radio access networks that emit wireless load data signals LDSI. For sake of clarity, only two radio access networks are shown, and more radio access networks are hinted at by three dots. It is understood, that the broadcast network BCN may comprise any number of radio access networks distributed over the area of operation of the operator of the broadcast network BCN. The core network CRN provides load data 104 to the radio access networks for transmission to receiving devices in the load data signals LDSI. The load data 104 may be provided from the load data source network LDSN to the core network CRN directly. The load data 104 provided by the load data source network LDSN is capable of being separated into load data parts for transmission by the radio access networks of the first group RAN1.

In embodiments, the load data source network LDSN may be implemented as the core network CRN. In such embodiments, the load data 104 may be provided from any other source to the core network CRN. Further, it is understood, that the above-presented explanations regarding load data source networks and broadcast networks may be applied to the load data source network LDSN and the broadcast network BCN.

In addition, in other embodiments, the network manager 100 may be provided as component of the load data source network LDSN or as component of the broadcast network BCN, especially of the core network CRN.

The radio access networks of the first group RAN1 emit the load data signal LDSI in geographical regions that overlap at least partially. That means that the receiving device may receive the load data signals LDSI of at least two of the radio access networks of the first group RAN1 concurrently.

The network manager 100 comprises a data interface 101 that is internally communicatively coupled to a network controller 102. Externally, the data interface 101 is communicatively coupled to the load data source network LDSN and to the broadcast network BCN.

The network controller 102 receives load data metadata 103 from the load data source network LDSN. The load data metadata 103 may inform the network controller 102 about the load data 104 and the possibilities of separating the load data 104 into different load data parts.

It is understood, that the separation of the load data 104 into load data parts may be performed in the load data source network LDSN or in the broadcast network BCN. It is also possible that the load data 104 is provided to the network controller 102 and the network controller 102 performs the separation of the load data 104 into load data parts.

The network controller 102 further provides different configuration data 105 to the at least two of the radio access networks of the first group RAN1. The configuration data 105 serves for configuring the at least two radio access networks to each use individual radio access network resources for transmission of at least two respective load data parts.

The individual radio access network resources may for example comprise a geographical location for transmission of the load data 104, a frequency range or bandwidth for transmission of the load data 104, a transmission time or time slot for transmission of the load data 104, and a modulation scheme used for transmission of the load data 104.

The network controller 102 may request information about reservations of radio access network resources in the radio access networks from at least one of the load data source network LDSN and the radio access networks. This allows providing the configuration data 105 based on the most recent reservations of radio access network resources.

In cases, where the network controller 102 receives the load data 104 and provides the load data 104 to the broadcast network BCN, the network controller 102 may also amend at least one of the load data parts to include reception information regarding the other load data parts. Such reception information may for example comprise at least one of timing information, synchronization information, data regarding radio access network resources used for transmission of the respective load data parts, and data indicating an operation mode change for a receiving device 190, especially indicating switching the receiving device 190 into a multichannel receiving mode.

The receiving device 190 may for example comprise a smartphone, and comprises an antenna 191. The antenna 191 is communicatively coupled to a wireless receiver 192. Further, the receiving device 190 comprises a reception controller 193 that is communicatively coupled to the wireless receiver 192.

The wireless receiver 192 may receive data via a cellular network and via a broadcast network BCN, especially via the radio access networks of the first group RAN1. The reception controller 193 controls the wireless receiver 192 to operate in a first and a second operation mode. In the first operation mode the wireless receiver 192 receives load data 104 via the cellular network. In the second operation mode, also called multichannel receiving mode, the wireless receiver 192 receives the different load data parts of the load data 104 via at least one broadcast network BCN and/or a cellular network.

In the second operation mode the reception controller 193 combines the received load data parts to reconstruct the full load data 104.

Figure 2:
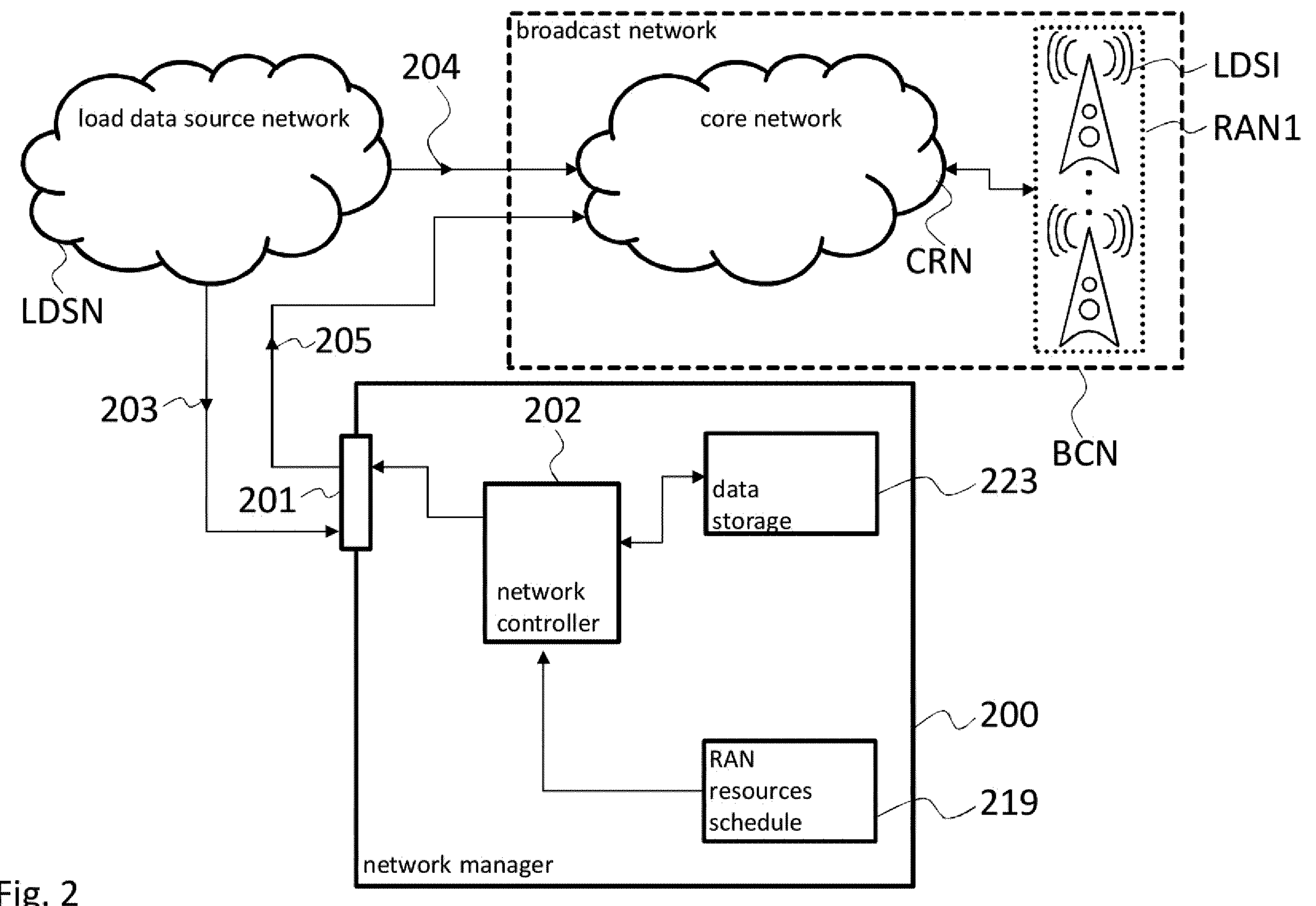
FIG. 2 shows a schematic diagram of another embodiment of a network manager according to the present disclosure, a load data source network and a broadcast network.

FIG. 2 shows another a network manager 200 with a load data source network LDSN and a broadcast network BCN.

The above explanations regarding the load data source network LDSN and the broadcast network BCN apply mutatis mutandis.

The network manager 200 is based on the network manager 100, and therefore comprises a data interface 201 that is internally communicatively coupled to a network controller 202. Externally, the data interface 201 is communicatively coupled to the broadcast network BCN and the load data source network LDSN. The above-presented explanations regarding the network manager 100 and its components also apply to the network controller 200 and its components mutatis mutandis.

The network manager 200 further comprises a radio access network resources schedule 219 that comprises information about reservations of radio access network resources for the broadcast network BCN. The network controller 202 may reliably determine which radio access network resources are available for transmission of the load data parts from the content of the radio access network resources schedule 219.

Further, the network manager 200 comprises a data storage 223 that may receive the load data 204 and store the received load data 204 prior to providing the load data parts to the radio access networks for transmission in the load data signal LDSI. In the network manager 200 the data storage 223 is communicatively coupled to the network controller 202. It is understood, that the data storage 223 may also be communicatively coupled to the data interface 201 and receive the load data 204 from the load data source network LDSN directly.

Figure 3:
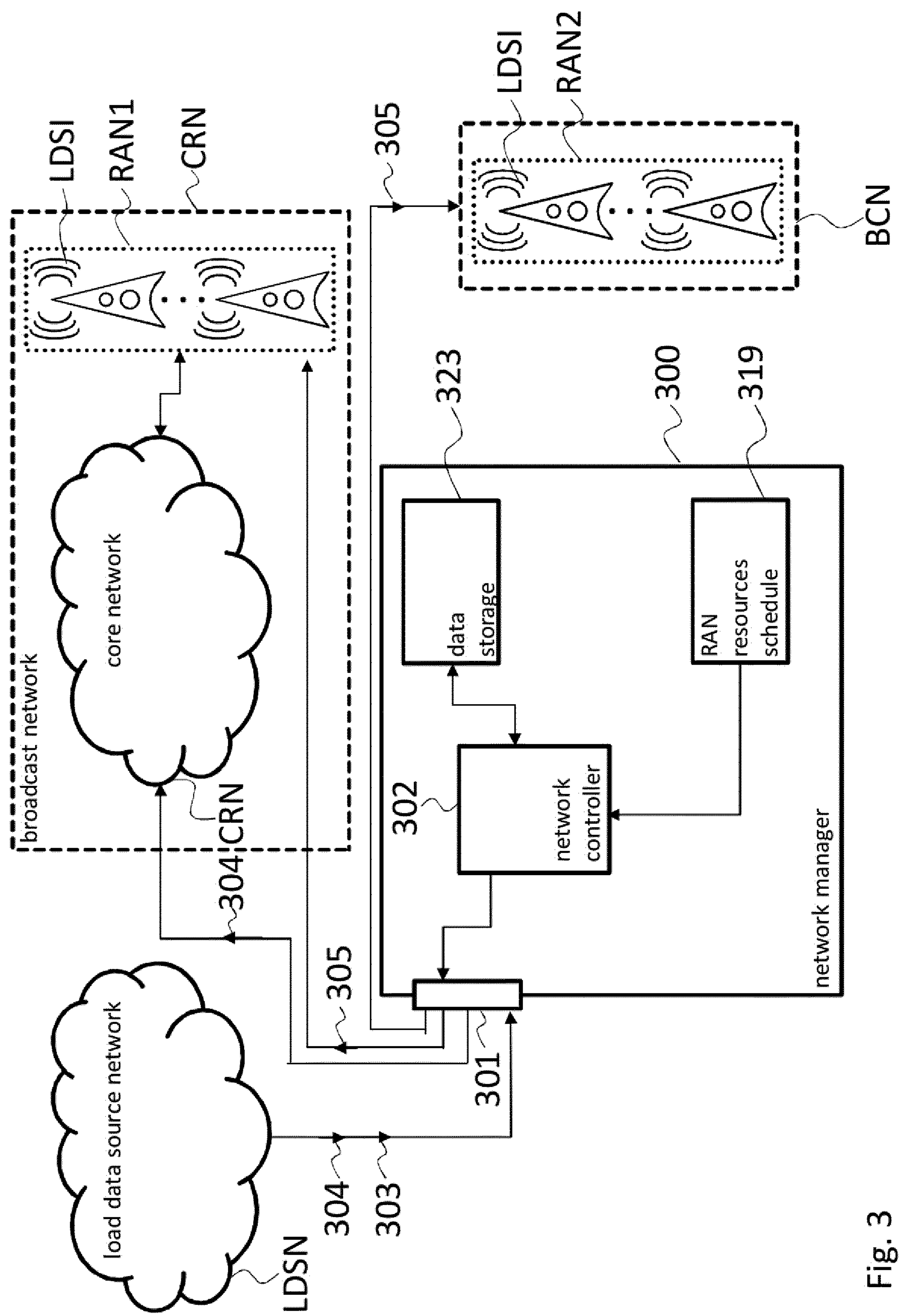
FIG. 3 shows a schematic diagram of another embodiment of a network manager according to the present disclosure, a load data source network and a broadcast network.

FIG. 3 shows another network manager 300. The network manager 300 is based on the network manager 200, and therefore comprises a data interface 301 that is internally communicatively coupled to a network controller 302. Externally, the data interface 301 is communicatively coupled to the load data network LDS and a core network CRN of a broadcast network BCN. The data interface 301 is also externally communicatively coupled to a second broadcast network BNC with a second group RAN2 of radio access networks. Although not explicitly shown, the second broadcast network BCN may also comprise a core network.

The above-presented explanations regarding network manager 200 and its elements apply mutatis mutandis to network manager 300 and its elements.

In contrast to the arrangement of FIG. 2, in FIG. 3 the network manager 300 receives the load data 304 and forwards the load data 304 to the core network CRN of the first broadcast network BCN and to the second broadcast network BCN. It is understood, that the network manager 300 may also provide the load data 304 to the radio access networks, instead.

The network controller 302 may amend at least one of the load data parts transmitted via the radio access networks of the first group RAN1 to include reception information regarding the load data parts transmitted via the radio access networks of the second group RAN2, and vice versa. This allows receiving devices to move between the areas that are serviced by the first group RAN1 and the second group RAN2 and continuously receive the load data.

For sake of clarity in the following description of the method-based FIG. 4 the reference signs used above in the description of apparatus based FIGS. 1-3 will be maintained.

Figure 4:
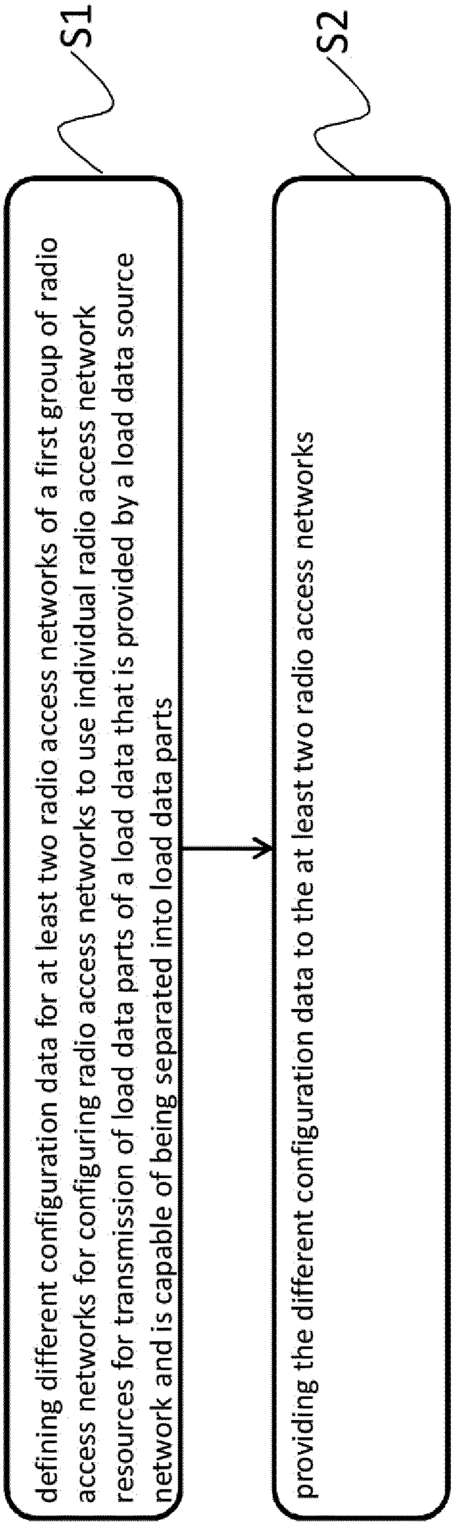
FIG. 4 shows a flow diagram of an embodiment of a method according to the present disclosure.

FIG. 4 shows a flow diagram of a method for managing a broadcast network BCN.

The method comprises defining S1 different configuration data 105, 205, 305 for at least two radio access networks of a first group RAN1 of radio access networks for the purpose of configuring the at least two radio access networks to each use individual radio access network resources for transmission of at least two respective load data parts of a load data 104, 204, 304 that is provided by a load data source network LDSN and is capable of being separated into load data parts for transmission by the radio access networks of the first group RAN1. The method further comprises providing S2 the different configuration data 105, 205, 305 to the at least two radio access networks.

The first group RAN1 of radio access networks comprising at least two radio access networks of the broadcast network BCN that are configured to wirelessly emit a load data signal LDSI, wherein the geographical regions in which the radio access networks of the first group RAN1 emit the load data signal LDSI overlap at least partially.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

LIST OF REFERENCE SIGNS

100, 200, 300 network manager
101, 201, 301 data interface
102, 202, 302 network controller
103, 203, 303 load data metadata
104, 204, 304 load data
105, 205, 305 configuration data
219, 319 radio access network resources schedule
223, 323 data storage
190 receiving device
191 antenna
192 wireless receiver
193 reception controller
RAN1, RAN2 group of radio access networks
LDS load data signal
BCN broadcast network
CRN core network
LDSN load data source network
S1, S2 method step

The invention claimed is:

1. A network manager comprising:

a data interface configured to communicatively couple to a first group of radio access networks comprising at least two radio access networks of a broadcast network (BCN) that are configured to wirelessly emit a load data signal (LDSI), wherein geographical regions in which the radio access networks of the first group emit the load data signal (LDSI) overlap at least partially, and to communicatively couple to a load data source network (LDSN) that provides load data capable of being separated into load data parts for transmission by the radio access networks of the first group, wherein different load data parts are provided by the LDSN to different ones of the radio access networks of the first group; and a network controller communicatively coupled to the data interface and configured to provide different configuration data to at least two of the radio access networks of the first group for the purpose of configuring the at least two radio access networks to each use individual radio access network resources for transmission of at least two respective load data parts.

2. The network manager according to claim 1, wherein the individual radio access network resources comprise at least one of:

a geographical location for transmission of the load data, a frequency range or bandwidth for transmission of the load data, a transmission time or time slot for transmission of the load data, or a modulation scheme used for transmission of the load data.

3. The network manager according to claim 1, wherein the network controller is configured to provide the configuration data based on a radio access network resources schedule of the BCN, the radio access network resources schedule comprising information about reservations of radio access network resources for the BCN.

4. The network manager according to claim 1, wherein the network controller is configured to request information about reservations of radio access network resources in the radio access networks from at least one of the LDSN and the radio access networks, and provide the configuration data based on received responses.

5. The network manager according to claim 1, wherein the network controller is configured to amend at least one of the load data parts to include reception information regarding the other load data parts; and wherein the reception information comprises at least one of timing information, synchronization information, data regarding radio access network resources used for transmission of the respective load data parts, or data indicating an operation mode change for a receiving device that indicates switching the receiving device into a multichannel receiving mode.

6. The network manager according to claim 1, wherein the data interface is configured to couple to a second group of radio access networks comprising at least two radio access networks that are configured to wirelessly emit a load data signal (LDSI), wherein the geographical regions in which the radio access networks of the second group emit the LDSI overlap at least partially;

wherein the network controller is configured to amend at least one of the load data parts transmitted via the radio access networks of the first group to include reception information regarding the load data parts transmitted via the radio access networks of the second group.

7. The network manager according to claim 1, comprising a data storage that is configured to receive the load data and store the received load data in the data storage prior to providing the load data parts to the radio access networks for transmission in the LDSI.

8. The network manager according to claim 1, wherein the at least two radio access networks of the BCN are configured to broadcast or multicast only one-way data transmissions that includes wirelessly emitting emit the LDSI.

9. A receiving device comprising:

a wireless receiver configured to receive load data via a cellular network and receive different load data parts of the load data via at least two radio access networks of a broadcast network (BCN); and a reception controller communicatively coupled to the wireless receiver and configured to control the wireless receiver in a first operation mode to receive the load data via the cellular network, and in a second operation mode to receive the different load data parts of the load data via different ones of the radio access networks of the BCN, wherein the different load data parts are assigned to the at least two radio access networks by a load data source network (LDSN);

wherein in the second operation mode the reception controller is configured to combine the received load data parts to reconstruct a load data transmitted via the BCN.

10. The receiving device according to claim 9, wherein the reception controller is configured to control the wireless receiver and reconstruct the load data based on reception information provided in at least one of the load data parts and based on at least one of timing information, synchronization information, data regarding radio access network resources used for transmission of the respective load data parts, or data indicating an operation mode change for a receiving device that indicates switching the receiving device into a multichannel receiving mode.

11. A method for managing a broadcast network (BCN), the method comprising:

defining different configuration data for at least two radio access networks of a first group of radio access networks for the purpose of configuring the at least two radio access networks to each use individual radio access network resources for transmission of at least two respective load data parts of a load data that is provided by a load data source network (LDSN) and is capable of being separated into load data parts for transmission by the radio access networks of the first group, wherein the first group of radio access networks comprises at least two radio access networks of the BCN that are configured to wirelessly emit a load data signal (LDSI), wherein different load data parts are provided by the LDSN to different ones of the radio access networks of the first group, wherein geographical regions in which the radio access networks of the first group emit the LDSI overlap at least partially; and providing the different configuration data to the at least two radio access networks.

12. The method according to claim 11, wherein the individual radio access network resources comprise at least one of:

a geographical location for transmission of the load data, a frequency range or bandwidth for transmission of the load data, a transmission time or time slot for transmission of the load data, or a modulation scheme used for transmission of the load data.

13. The method according to claim 11, wherein the configuration data is provided based on a radio access network resources schedule of the BCN, the radio access network resources schedule comprising information about reservations of radio access network resources for the BCN.

14. The method according to claim 11, further comprising:

requesting information about reservations of radio access network resources in the radio access networks from at least one of the LDSN and the radio access networks, and providing the configuration data based on received responses.

15. The method according to claim 11, further comprising:

amending at least one of the load data parts to include reception information regarding the other load data parts;

wherein the reception information comprises at least one of timing information, synchronization information, data regarding radio access network resources used for transmission of the respective load data parts, or data indicating an operation mode change for a receiving device that indicates, switching the receiving device into a multichannel receiving mode.

16. The method according to claim 11, further comprising:

amending at least one of the load data parts transmitted via the radio access networks of the first group to include reception information regarding load data parts transmitted via at least two radio access networks of a second group of radio access networks;

wherein the second group comprises at least two radio access networks that are configured to wirelessly emit a load data signal (LDSI), wherein geographical regions in which the radio access networks of the second group emit the LDSI overlap at least partially.

17. The method according to claim 11, further comprising:

receiving the load data and storing the received load data prior to providing the load data parts to the radio access networks for transmission in the LDSI.

* * * * *